Feb. 5, 1924.
J. W. BICKEL
METER
Filed Jan. 27, 1921
1,483,039
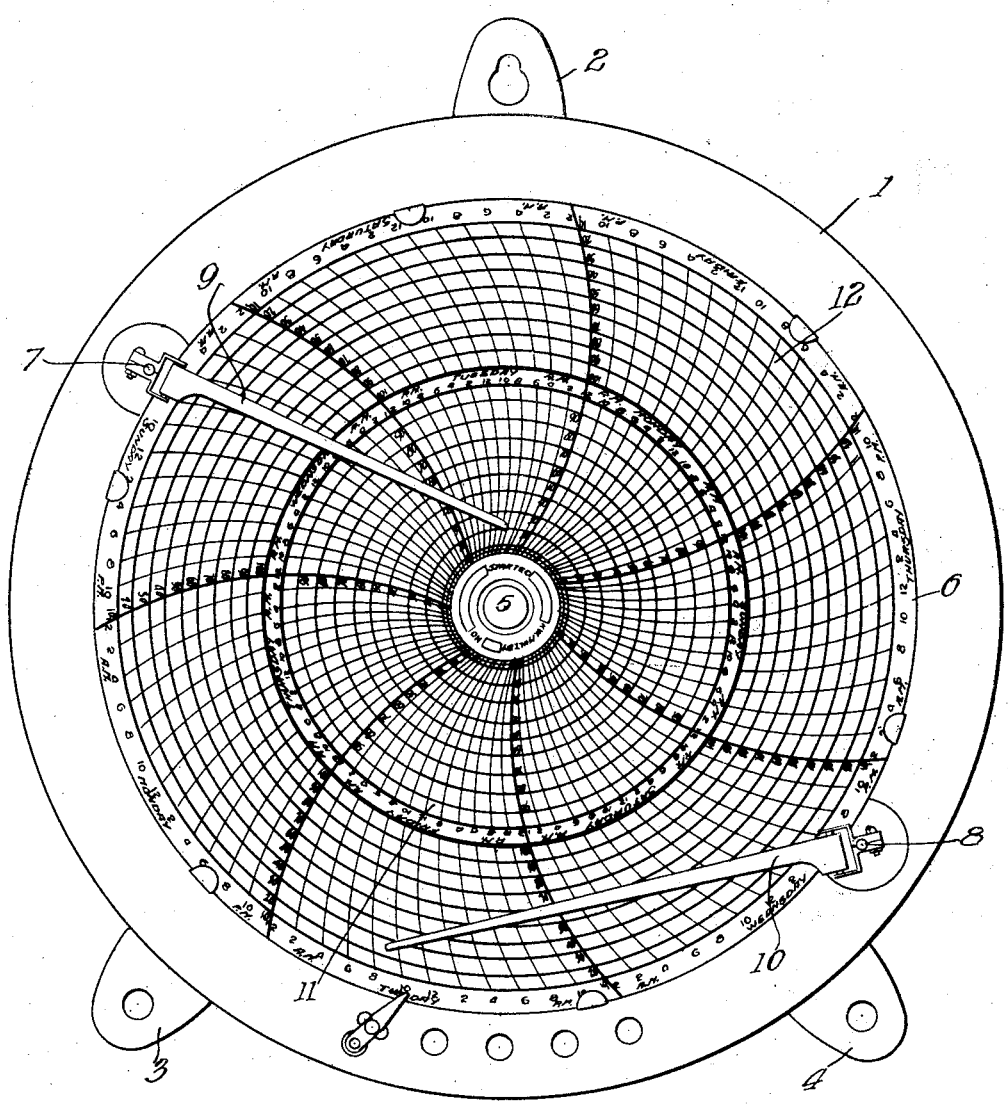

Patented Feb. 5, 1924.

1,483,039

UNITED STATES PATENT OFFICE.

JOSEPH W. BICKEL, OF CHICAGO HEIGHTS, ILLINOIS, ASSIGNOR OF ONE-HALF TO GEORGE S. BARTLETT, OF EVANSTON, ILLINOIS.

METER.

Application filed January 27, 1921. Serial No. 440,258.

*To all whom it may concern:*

Be it known that I, JOSEPH W. BICKEL, a citizen of the United States, residing at Chicago Heights, in the county of Cook and State of Illinois, have invented a certain new and useful Improvement in Meters, of which the following is a full, clear, concise, and exact description, reference being had to the accompanying drawings, forming a part of this specification.

My invention relates to meters particularly to electrically operated graphic or recording meters used in conjunction with watt hour meters for recording the amount of power consumed during a specific period such for instance as a half hour period. Meters of this character are generally called "maximum demand meters." It is customary to bill a customer on the basis of the maximum demand for power which he makes upon the station and the meter which I have provided and which embodies the present invention is designed to employ two recording needles or styli upon a single unitary chart, the two needles being operated from a single clock mechanism for determining the half hour period at the beginning or expiration of which half hour period the needles or styli are reset.

The needles or styli are moved from zero position progressively in step by step fashion as is well understood by those skilled in the art by a ratchet and pawl mechanism and they are restored to zero at the end of the time period by a release operated by a time controlled mechanism such as a clock. The two pointers operate on different portions of the chart or recording surface, which recording surface in this instance is preferably a flat disk or sheet of paper rotated about a central pivot or axis.

By means of this provision of the two pointers being controlled by the same time mechanism, it is possible to perform a number of functions not heretofore possible in the art which I shall illustrate by the following examples:

Assume that the service company employes a watt hour meter and a maximum demand meter and that the customer also employs a watt hour meter and it is desired that the customer's meter be checked against the service company's meter, it is possible with my instrument to make a record of the demand as measured by both instruments upon the same record so that the service company's meter may be constantly checked against the customer's meter and the customer may then ascertain the correctness of the demand charge made against him by referring to the record made by his own meter.

As a second illustration of the use of my meter, assume that the service company desires to make duplicate records, one of which may be retained in its custody and the other of which is transmitted to the customer with the bill for power, it is possible by placing the two advancing elements in parallel to make a duplicate record upon the two parts of the charts, which parts may then be severed and one part retained by the company as a basis for its bill and the other part transmitted with the bill to the customer. At present the customer has no record of the chart upon which he is billed since only a single chart is made and at present no known method of duplicating this chart is feasible.

This use of the meter is particularly applicable to most industrial establishments since most customers are billed upon a rate based upon maximum demand and the character of the demand.

In order to acquaint those skilled in the art with the manner of constructing and practicing my invention I shall now describe a specific embodiment of the same in connection with the accompanying drawings in which:

The figure is a front elevation illustrating the invention.

As indicated in the drawing, the meter comprises a casing 1 having the lugs 2, 3 and 4 for mounting the casing upon a suitable instrument board, this casing being preferably covered with a glass cover which has been removed to illustrate more clearly the operation of the device.

The inner mechanism of the meter which is not specifically described herein is of the well known type of demand meter, such for instance as is now manufactured by the General Electric Company and which I do not believe it is necessary to describe in detail. This meter mechanism has a central shaft 5 which extends out through the meter casing and which drives the rotary chart 6, this chart preferably consisting of a suitable recording surface adapted to be engaged by a stylus which makes a mark thereupon. The meter is provided with two stepping devices, such, for instance, as that disclosed in patent to Dempster 1,132,308, March 16, 1915, (not shown) connected to the shafts 7 and 8, respectively, for advancing the pointers 9 and 10, which pointers bear at their outer extremities suitable needles or styluses (not shown) as is well understood by those skilled in the art. The mechanism of the meter also includes a single timing device such, for instance, as those shown by Patent 1,318,723 to Bradshaw, October 14, 1919, and Patent 1,279,378 to Pogue, September 17, 1918, namely, a clock, which periodically, namely, at the end of the half hour, disconnects the stepping mechanism of the respective shafts 7 and 8 from the said shafts 7 and 8 so that the pointers 9 and 10 drop back by gravity to their zero positions.

The chart 6 comprises two concentric portions, namely, the inner portion 11 and the outer concentric portion 12. The stylus arm or pointer 9 is adapted to operate upon the inner chart 11 and the stylus arm or pointer 10 is adapted to operate upon the outer portion 12. The charts are graduated on arcuate lines running in a direction generally radially from the central shaft 5, each needle moving upwardly according to the number of units of power consumed during the given period and consequently the charts are graduated to correspond to said movement. The inner chart 11 reads outwardly from zero while the outer chart 12 reads inwardly from zero.

Where it is desired to make duplicate charts as above indicated so that the customer may have a chart with the bill which is rendered to him, the two stepping mechanisms are merely connected in parallel and after the record is made the inner record is severed from the outer record and one or the other may be retained by the service company and the other sent with the bill to the consumer.

Where it is desired to have the maximum demand meter record on the same chart from two separate meters, as for instance, from the service company's meter and from the customer's meter, the two stepping mechanisms are connected to their respective meters and make a record upon the same chart.

Without further elaboration, the foregoing will so fully explain my invention, that others may, by applying current knowledge, readily adapt the same for use under various conditions of service, without eliminating certain features which may properly be said to constitute the essential items of novelty involved, which items are intended to be defined and secured to me by the following claims:

I claim:

1. In combination, a one-piece chart having two concentric portions, each portion carrying graduations and complete indicia for reading the same, whereby the two portions may be separated for independent use.

2. Means for making duplicate charts of the same phenomena, comprising a one-piece chart having two concentric portions, duplicate indicia on said portions whereby each portion may be separated and used independently, and similar recording mechanisms each adjusted to record on one of said portions and both operated to record the same phenomena.

In witness whereof, I hereunto subscribe my name this 25th day of January, 1921.

JOSEPH W. BICKEL.